United States Patent [19]

Suzuki et al.

[11] Patent Number: 5,475,591
[45] Date of Patent: Dec. 12, 1995

[54] SHIFT CONTROL SYSTEM FOR AUTOMATIC TRANSMISSION BASED ON FUZZY CONTROL

[75] Inventors: Yutaka Suzuki, Atsugi; Masayuki Yasuoka, Yokosuka, both of Japan

[73] Assignee: Nissan Motor Co., Ltd., Yokohama, Japan

[21] Appl. No.: 46,860

[22] Filed: Apr. 14, 1993

[30] Foreign Application Priority Data

Apr. 14, 1992 [JP] Japan ................................. 4-094389

[51] Int. Cl.$^6$ .................................................. B60K 41/06
[52] U.S. Cl. ...................... 364/424.1; 395/900; 395/905; 477/34; 477/115
[58] Field of Search ......................... 364/424.1; 395/900, 395/905; 477/79, 80, 86, 115, 120, 34, 121

[56] References Cited

U.S. PATENT DOCUMENTS

| | | |
|---|---|---|
| 4,724,723 | 2/1988 | Lockhart et al. ..................... 477/102 |
| 4,841,815 | 6/1989 | Takahashi ..................... 364/424.1 X |
| 4,953,090 | 8/1990 | Narita ..................... 364/424.1 |
| 5,079,705 | 1/1992 | Sakai et al. ..................... 364/424.1 |
| 5,095,435 | 3/1992 | Tokoro et al. ..................... 364/424.1 |
| 5,107,724 | 4/1992 | Takizawa ..................... 477/97 |
| 5,241,477 | 8/1993 | Narita ..................... 364/424.1 |
| 5,289,740 | 3/1994 | Milunas et al. ..................... 364/424.1 X |
| 5,303,153 | 4/1994 | Sakai et al. ..................... 364/424.1 |
| 5,323,318 | 6/1994 | Hasegawa et al. ..................... 364/424.1 |

FOREIGN PATENT DOCUMENTS 2-3738  1/1990  Japan .

*Primary Examiner*—Kevin J. Teska
*Assistant Examiner*—Collin W. Park
*Attorney, Agent, or Firm*—Foley & Lardner

[57] ABSTRACT

Sensors (20, 21) provide a degree of throttle valve opening (TVO) and an output shaft revolution speed (No) to CPU (10), respectively. CPU (10) carries out a fuzzy inference for each gear position based on two kinds of parameters referring to a driving force deviation (Ef(i)) and a fuel consumption ratio (Qf(i)), and selects a speed change ratio which makes the appraisals for the driving force deviation and the fuel consumption ratio best, as a mark speed change ratio for the next gear position (NextGp), according to a predetermined program. Thus the shift control system selects a gear position corresponding to the speed change ratio by which the deviation between the driver's requiring driving force and the driving force after shifting becomes few, while the fuel consumption ratio becomes good.

22 Claims, 13 Drawing Sheets

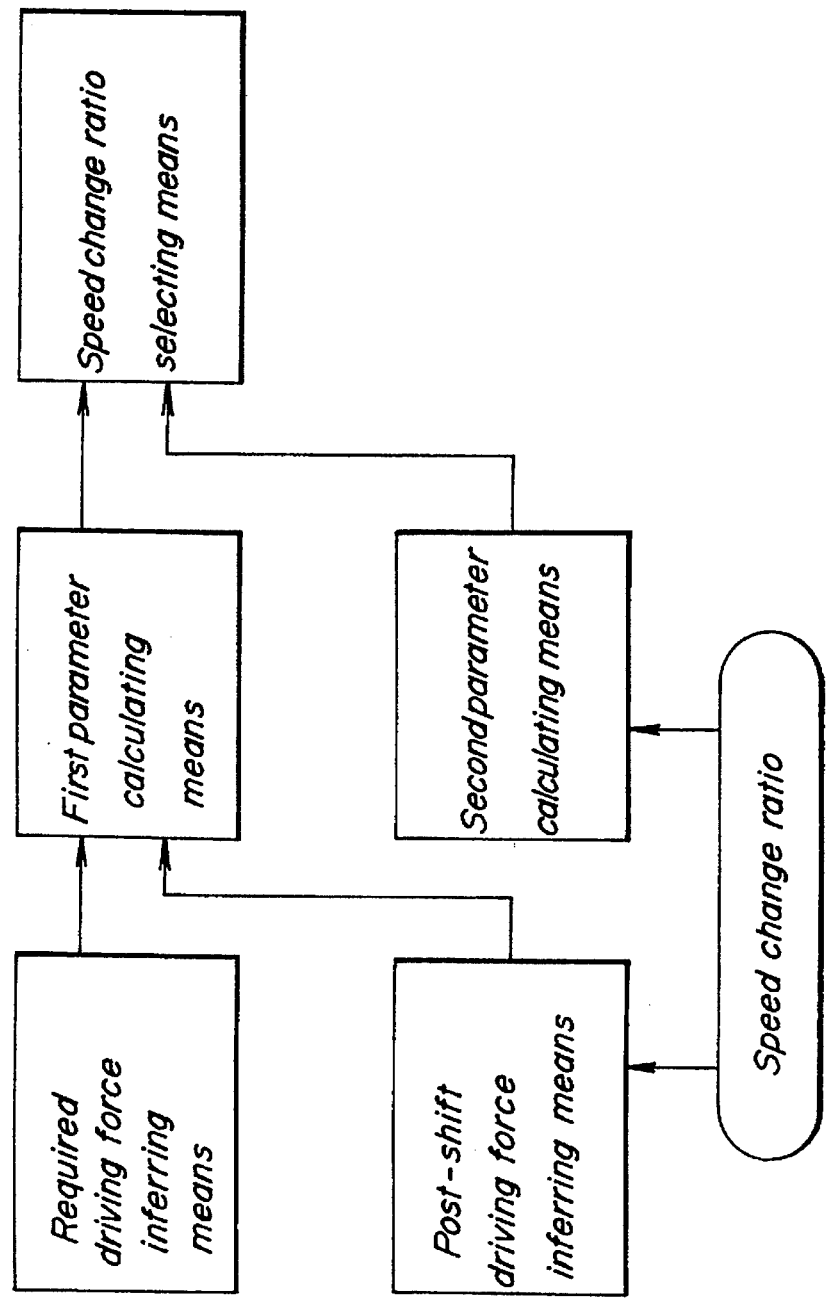

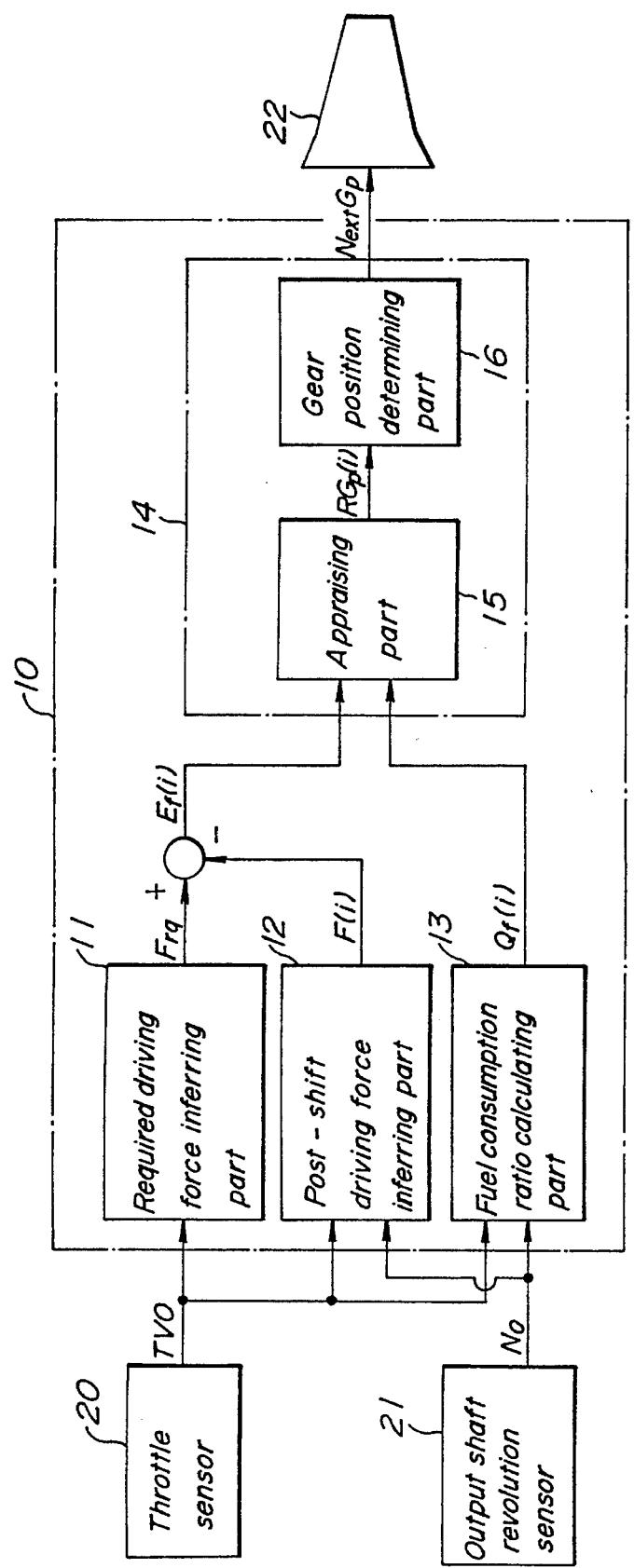
FIG_2

FIG._3
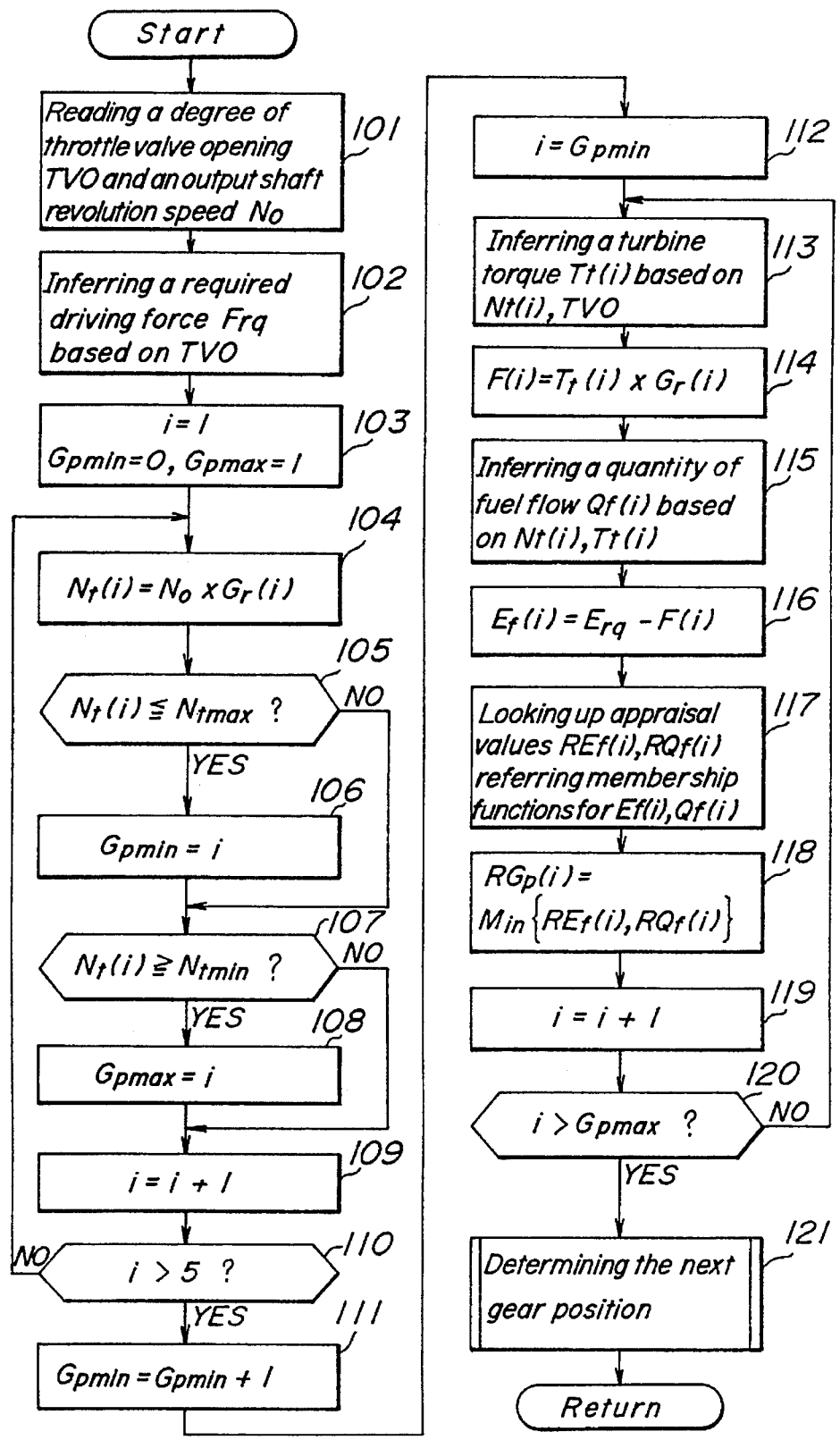

FIG_4a
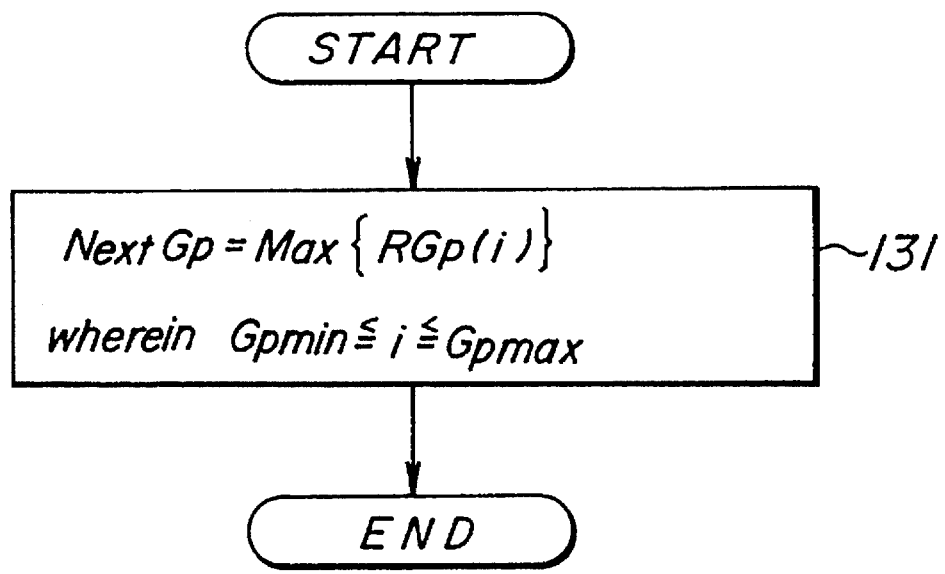
FIG_4b
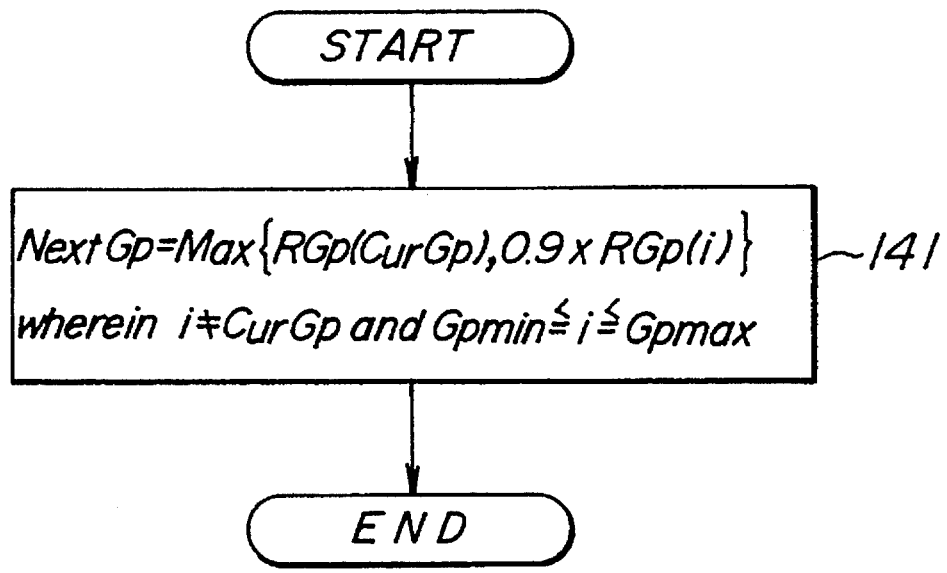

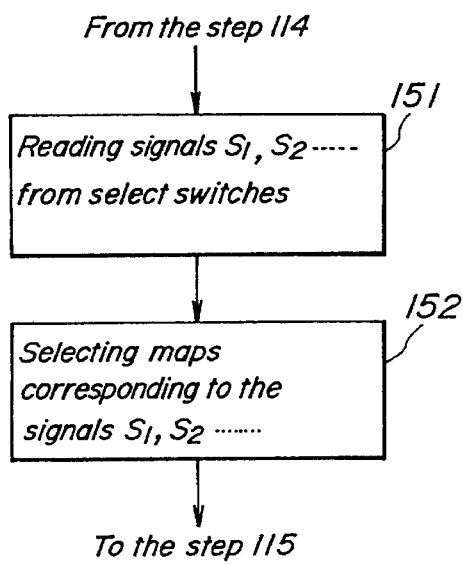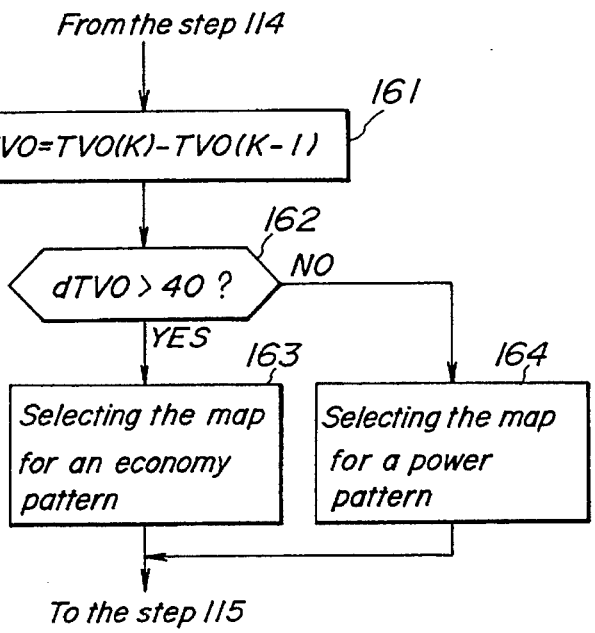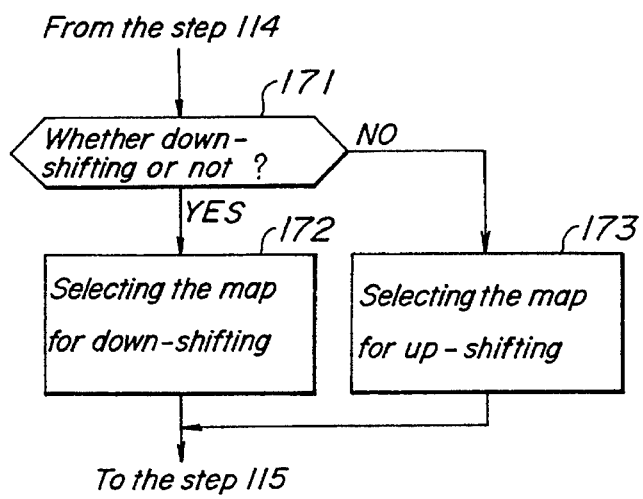

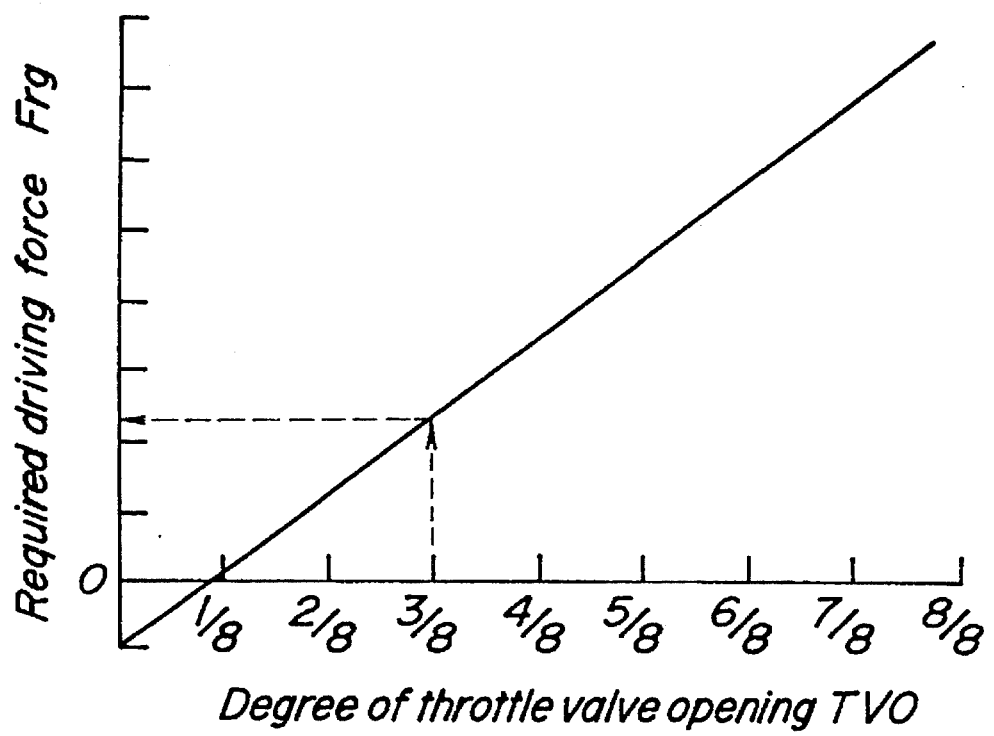
FIG_6

FIG._13

SHIFT CONTROL SYSTEM FOR AUTOMATIC TRANSMISSION BASED ON FUZZY CONTROL

BACKGROUND OF THE INVENTION

1. Field of the Invention

The present invention relates to a shift control system for the adjustment of the speed change ratio in an automatic transmission suitable for an automotive vehicle relying on the use of the "fuzzy theory".

2. Description of the Related Art

A shift control system for controlling the shifting of gears in an automatic transmission for an automotive vehicle relying on the use of the "fuzzy theory" is disclosed in Japanese Patent Application Laid-open Publication No. 2-3,738. The known shift control system is to set membership functions for a fuzzy set for each driving condition of the vehicle and for each variation of driving conditions of the vehicle which may take place due to shifting from the present gear position to another gear position. And the system is consisted to carry out fuzzy inference utilizing the membership functions, a just prior driving condition and a present variation of a driving condition so as to determine the next gear position.

Further, to carry out the fuzzy inference, the known shift control system is with many production rules e.g. "If engine revolution is excessively high, then up-shift one step to protect the engine.", so that the system performs shifting control to simulate shifting judgments and all kinds of control by a skillful driver driving a vehicle with manual transmission.

The known shift control system thus selects one among many production rules made from driver's experiential rules, based on a just prior driving condition and a present variation of a driving condition. Consequently, the known system realizes an intended shifting control (in this case, control for dissolving driver's feeling of physical disorder due to shift-hunting etc.) which has been intended when setting the production rules. On the other hand, it is difficult for the known system to realize the shifting control which has not been intended when setting the production rules.

For example, to improve a fuel consumption ratio, the known shift control system must rewrite all the production rules, or must tune for the fuel consumption ratio by trial and error just as the previous automatic transmissions.

SUMMARY OF THE INVENTION

It is therefore an object of the present invention to provide a shift control system which resolves the above mentioned problem by executing a shift control which performs a speed change ratio when makes appraisals of two parameters and determine which describes desired shifting control better.

To this end, the shift control system for controlling a gear-shifting according to the present invention, the basic concept of which is shown in FIG. 1, comprises required driving force inferring means which infer a driving force required by a driver, post-shift driving force inferring means which infer a driving force after shifting for each speed change ratio, first parameter calculating means which calculate a deviation between the required driving force and the driving force after shifting and sets a first parameter for the deviation, second parameter calculating means which calculate a second parameter for each speed change ratio, and speed change ratio selecting means which appraise the first parameter and the second parameter and select a speed change ratio which makes the appraisals best as a mark speed change ratio.

With the above mentioned arrangement of the shift control system according to the present invention, the first parameter calculating means calculates a deviation between a driver's requiring driving force inferred by the required driving force inferring means and a driving force after shifting for each speed change ratio inferred by the post-shift driving force inferring means, and set a first parameter for the deviation. In the meantime, the second parameter calculating means calculates a second parameter for each speed change ratio. Then, the speed change ratio selecting means appraise the first parameter and the second parameter, and select a speed change ratio which makes the appraisal best as a mark speed change ratio. Thus, the object of the invention can be achieved, so that a desirable shifting control can be obtained.

According to one preferred embodiment of the present invention, a fuel consumption ratio is chosen as the second parameter. With the embodiment, the shift control system selects a gear position corresponding to the speed change ratio by which the deviation between the driver's requiring driving force and the driving force after shifting is small, while the fuel consumption ratio becomes good.

Incidentally, with the present invention, if it is intended to change either the first or the second parameter to another parameter, the design requirement can be satisfied by changing only the membership functions corresponding to the parameter intended to change. On the other hand, if it is intended to attach more weight to either the first or the second parameter, the design requirement can be satisfied by changing weight for the intended parameter, without previous trial and error tuning, thus a degree of freedom for designing the system can be increased.

Furthermore, according to another preferred embodiment of the present invention, the post-shift driving force inferring means and the second parameter calculating means evaluate the driving force after shifting and the second parameter for each speed change ratio of a finite speed change ratio sequence including the maximum and the minimum speed change ratio, corresponding to the vehicle speed respectively, then the speed change ratio selecting means determine the appraisal values for each speed change ratio by appraising the first and the second parameter, and select a speed change ratio corresponding to the position of a center of gravity among these appraisal values as the mark speed change ratio.

Furthermore, according to an alternative preferred embodiment of the present invention, the post-shift driving force inferring means and the second parameter calculating means evaluate the driving force after shifting and the second parameter for each speed change ratio of a finite speed change ratio sequence including the maximum and the minimum speed change ratio, corresponding to the vehicle speed change ratio, corresponding to the vehicle speed respectively, then the speed change ratio selecting means determine the appraisal values for each speed change ratio by appraising the first and the second parameter, and select a speed change ratio corresponding to the maximum appraisal value as the mark speed change ratio.

Furthermore, according to another preferred embodiment of the present invention, the post-shift driving force inferring means and the second parameter calculating means evaluate the driving force after shifting and the second parameter for each speed change ratio of a finite speed change ratio sequence between a speed change ratio which arises the engine speed to the maximum speed in an allowable engine speed range and a speed change ratio which reduces the engine speed to the minimum speed in the allowable engine speed range, corresponding to the vehicle speed respectively, then the speed change ratio selecting means determine the appraisal values for each speed change ratio by appraising the first and the second parameter, and select a speed change ratio corresponding to the position of a center of gravity among these appraisal values as the mark speed change ratio.

Furthermore, according to an alternative preferred embodiment of the present invention, the post-shift driving force inferring means and the second parameter calculating means evaluate the driving force after shifting and the second parameter for each speed change ratio of a finite speed change ratio sequence between a speed change ratio which increases the engine speed to the maximum speed in an allowable engine speed range and a speed change ratio which reduces the engine speed to the minimum speed in the allowable engine speed range, corresponding to the vehicle speed respectively, then the speed change ratio selecting means determine the appraisal values for each speed change ratio by appraising the first and the second parameter, and select a speed change ratio corresponding to the maximum appraisal value as the mark speed change ratio.

Furthermore, according to another preferred embodiment of the present invention, the smaller one of the first membership function in respect of the deviation between the driving forces as the first parameter and the second membership function in respect of the second parameter is used as the appraisal value of each speed change ratio by the speed change ratio selecting means so as to select the mark speed change ratio.

Furthermore, according to another preferred embodiment of the present invention, the required driving force is inferred from an engine load by the required driving force inferring means.

Furthermore, according to another preferred embodiment of the present invention, the post-shift driving force is inferred from a vehicle speed, an engine load and a speed change ratio by the post-shift driving force inferring means.

Furthermore, according to another preferred embodiment of the present invention, either or both of the first and the second membership function are set and memorized as plural functions, and one or more functions are selected among the memorized functions by a driver's switching action.

Furthermore, according to an alternative preferred embodiment of the present invention, either or both of the first and the second membership function are set and memorized as plural functions, and one or more functions are selected among the memorized functions corresponding to a driving condition.

Furthermore, according to another preferred embodiment of the present invention, when up-shifting is to be executed for speed change ratios higher than the present speed change ratio, appraisal values of the first parameter are set smaller than that of down-shifting. On the other hand, when down-shifting is to be executed for speed change ratios lower than the present speed change ratio appraisal values of the first parameter are set smaller than that of up-shifting by the speed change ratio selecting means. With each arrangement of the above mentioned embodiments, the object of the invention can be achieved.

BRIEF DESCRIPTION OF THE DRAWINGS

The present invention will now be explained in more detail with reference to some preferred embodiments shown in the attached drawings, in which:

FIG. 1 is the schematic diagram showing the basic concept of the present invention;

FIG. 2 is a block diagram showing a first embodiment of a shift control system according to the present invention;

FIG. 3 is a flow chart showing one example of a control program for CPU in the embodiment of the shift control system;

FIG. 4 (*a*) is a flow chart showing one example of a control program corresponding to a gear position determining step in FIG. 3, and FIG. 4 (*b*) is a flow chart showing another example of the same;

FIG. 5 (*a*), FIG. 5 (*b*) and FIG. 5 (*c*) are flow charts each showing an additional control program to the control program in FIG. 3, corresponding to a second, third and fourth embodiment of a shift control system according to the present invention;

FIG. 6 is a map available for inferring a required driving force in the control program in FIG. 3;

DETAILED EXPLANATION OF THE PREFERRED EMBODIMENT

Figure 7:
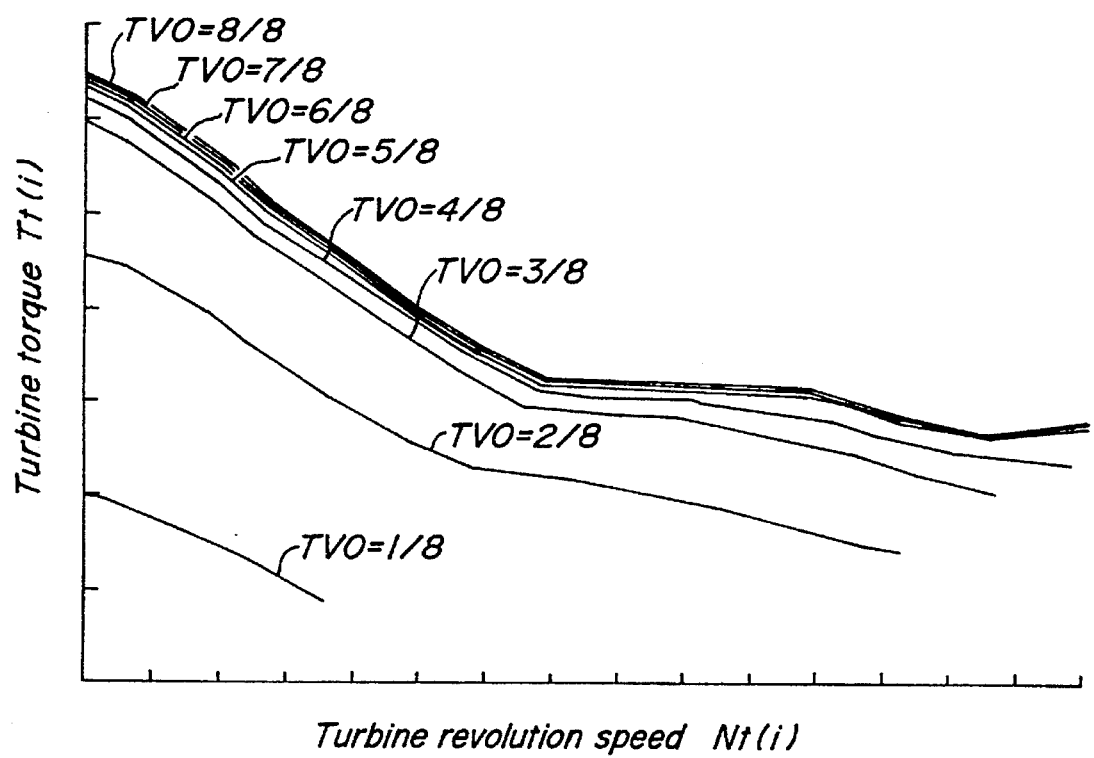
FIG. 7 is a map available for inferring a turbine torque in the control program in FIG. 3.

There is shown in FIG. 2 a first embodiment of a shift control system for an automatic transmission according to the present invention, having a central processing unit (CPU) 10. This CPU 10 includes a required driving force inferring part (corresponding to the required driving force inferring means) 11 to which is input a signal indicating a degree of throttle valve opening TVO from an engine throttle sensor 20 for detecting the engine load and which infers a driving force required by a driver.

CPU 10 further includes a post-shift driving force inferring part (corresponding to the post-shift driving force inferring means) 12 to which is input a signal indicating an output shaft revolution speed No from an output shaft revolution sensor 21 for detecting an output shaft revolution speed (corresponding to a vehicle speed) and the signal indicating the degree of throttle valve opening TVO from the engine throttle sensor 20 and which infers a driving force after shifting for each speed change ratio, a fuel consumption ratio calculating part (corresponding to the second parameter calculating means) 13 which is inputted the signals indicating TVO and No and calculates a fuel consumption ratio.

CPU 10 further includes a fuzzy gear position selecting part (corresponding to the speed change ratio selecting means) 14. The fuzzy gear position selecting part 14 has an appraising part 15 to which is input a deviation (driving force deviation) Ef(i) between a signal indicating the required driving force Frq outputted from the required driving force inferring part 11 and a signal indicating the post-shift driving force F(i) outputted from the post-shift driving force inferring part 12, as a first parameter, with a signal indicating the fuel consumption ratio Qf(i) outputted from the fuel consumption ratio calculating part 13 as a second parameter, and which carries out an appraisal with respect to these signals.

The fuzzy gear position selecting part 14 further has a gear position determining part 16 for determining a next gear position which achieves a mark speed change ratio based on an appraisal value RGp(i) outputted from the appraising part 15, and which commands an automatic transmission 22 to shift to the next gear position NextGp, wherein, the part in CPU 10 calculating the driving force deviation Ef(i) corresponds to the first parameter calculating means.

That is, based on the inputted TVO and No signal, CPU 10 carries out a gear-shifting control in accordance with the control program in FIG. 1 which is repeated at constant intervals by preset time interrupt services. With the control program in FIG. 1, CPU 10 reads the degree of throttle valve opening TVO (indicating one of the physical quantities corresponding to the engine load) from the engine throttle sensor 20 and the output shaft revolution speed No from the output shaft revolution sensor 21 respectively first at a step 101, and infers the required driving force Frq based on the degree of throttle valve opening TVO at the next step 102.

The inference of the required driving force Frq may be carried out by e.g. executing a one-dimensional map reference, wherein, if the degree of throttle valve opening TVO is intermediate between ⅖ and ⅜, the required driving force Frq may be determined by linear interpolation.

At the next step 103, CPU 10 sets a gear position i for the first gear (i=1) first of all, then sets Gpmin which is the minimum value of i for 0, and Gpmax which is the maximum value of i for 1, respectively (Gpmin=0, Gpmax=1). The reason of the employment of the gear position i is that the present embodiment is availed for the five speed automatic transmission 22 which is selected five speed change ratios among a finite speed change ratio sequence for simplifying the explanation, on the contrary, if a step 104 and following steps are executed for each speed change ratio in a finite speed change ratio sequence including the maximum and the minimum speed change ratio or in a finite speed change ratio sequence between a speed change ratio which arises the engine speed to the maximum speed in an allowable engine speed range and a speed change ratio which reduces the engine speed to the minimum speed in the allowable engine speed range, corresponding to a vehicle speed, the control can be available for a stepless transmission. Therefore, in the present example, the gear positions i are each corresponded to the speed change ratios one-to-one and the value of i is selected one among integers 1 to 5.

CPU 10 then evaluates a turbine revolution speed Nt(i) by multiplying No by a speed change ratio (gear ratio) Gr(i) at a step 104, and compares Nt(i) with Ntmax which is the maximum value of the turbine revolution speed in the gear position i at a step 105, wherein Ntmax is uniquely determined corresponding to the determination of the gear position i. As the result of the comparison, if Nt(i)≦Ntmax is established, CPU 10 then sets Gpmin for i at a step 106, or if Nt(i)≦Ntmax is not established, CPU 10 then skips the step 106.

At the next step 107, CPU 10 compares Nt(i) with Ntmin which is the minimum value of the turbine revolution speed in the gear position i, wherein Ntmin is also uniquely determined corresponding to the determination of the gear position i. As the result of the comparison, if Nt(i)≧Ntmin is established, CPU 10 then sets Gpmax for i at a step 108, or if Nt(i)≧Ntmin is not established, CPU 10 then skips the step 108.

At the next step 109, CPU 10 raises the gear position i one step (i=i+1). This raise of the gear position i is repeated until the result of a step 110 becomes YES, i.e. the gear position i reaches to the highest gear position, during which the loop from the step 110 resulted NO through step 104 to 109 and to the step 110 is carried out for setting Gpmin and Gpmax for each gear position i, so that the minimum value of i by which Nt(i)≦Ntmax is established is set for Gpmin, while the maximum value of i by which Nt(i)≧Ntmin is established is set for Gpmax finally. Thus setting of Gpmin and Gpmax for each gear position i is attained, and CPU 10 raises present Gpmin one step (Gpmin=Gpmin+1) at a step 111, then sets the raised Gpmin for i at a step 112.

At the next step 113, CPU 10 infers a turbine torque Tt(i) from the turbine revolution speed Nt(i) and the degree of throttle valve opening TVO. This inference of the turbine torque Tt(i) may be carried out by e.g. referring to a two-dimensional map as examply shown in FIG. 7 in regard to Nt(i) and TVO, wherein, if the combination of the turbine revolution speed Nt(i) and the degree of throttle valve opening TVO is not placed on the characteristic curves in FIG. 7, the turbine torque Tt(i) may be determined by surface interpolation.

At a step 114, CPU 10 then evaluates the post-shift driving force F(i) by multiplying the turbine torque Tt(i) by the speed change ratio Gr(i), wherein i should satisfy the condition Gpmin≦i≦Gpmax.

Figure 8:
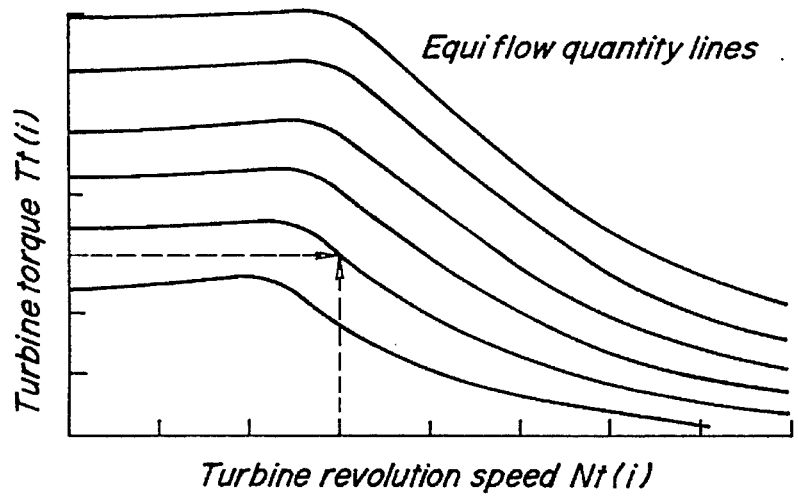
FIG. 8 is a map available for inferring a quantity of fuel flow in the control program in FIG. 3.

At the next step 115, CPU 10 infers the quantity of fuel flow Qf(i) from the turbine revolution speed Nt(i) and the turbine torque Tt(i). This inference of the quantity of fuel flow Qf(i) may be carried out by e.g. referring to a two-dimensional map as examply shown in FIG. 8 in regard to Nt(i) and Tt(i), wherein, if the combination of the turbine revolution speed Nt(i) and the turbine torque Tt(i) is not placed on the characteristic curves in FIG. 8, the quantity of fuel flow Qf(i) may be determined by surface interpolation, while i should satisfy the condition Gpmin≦i≦Gpmax.

After that, at a step 116, CPU 10 evaluates the driving force deviation Ef(i) between the required driving force Frq and the post-shift driving force F(i) by the equation Ef(i)= Frq−F(i), wherein the evaluated driving force deviation Ef(i) becomes a first parameter used for the following steps for appraising to determine a next gear position, while the quantity of fuel flow Qf(i) becomes a second parameter.

Figure 9:
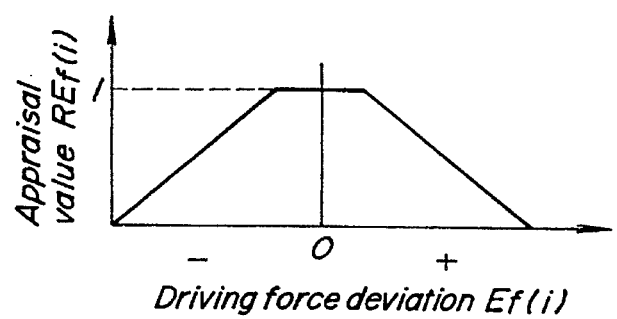
FIG. 9 is a membership function available for inferring a degree of achievement of the driving force in the control program in FIG. 3.
Figure 10:
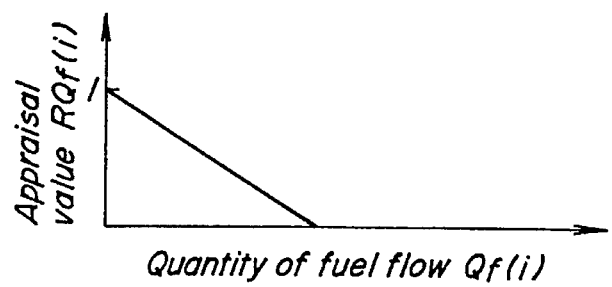
FIG. 10 is a membership function available for inferring the quantity of fuel flow in the control program in FIG. 3.

At a step 117, CPU 10 looks up appraisal values (membership values) REf(i) and RQf(i) of the driving force deviation Ef(i) and the quantity of fuel flow Qf(i) respectively, wherein REf(i) may be referred to a diagram for inferring the degree of achievement of the driving force (membership function) as illustratively shown in FIG. 9 in regard to Ef(i), and RQf(i) may be referred to a diagram for inferring the quantity of fuel flow (membership function) as illustratively shown in FIG. 10 in regard to Qf(i).

At the next step 118, CPU 10 evaluates an appraisal value RGp(i) of a degree of correspondence of the gear position by minimum calculation i.e. RGp(i)=Min{REf(i), RQf(i)}.

After that, CPU 10 raises the gear position i one step (i=i+1) at a step 119, then advances the control to a step 120 and carries out a judgment whether i>Gpmax or not. Based on this judgment, the control goes back from the step 120 resulted NO to the previous step 113, so that the loop from the step 113 to the step 120 is repeated until the result of a step 120 becomes YES, and finally, the above mentioned values are each determined for the gear position corresponding to i which satisfies the condition Gpmin≦i≦Gpmax. If the result of the judgment becomes YES, then CPU 10 advances the control to a step 121, and determines the next gear position at the step 121.

FIG. 4 (a) and FIG. 4 (b) are flow charts each showing a subroutine control program corresponding to the step 121. The present embodiment of the invention utilizes the subroutine in FIG. 4 (a), therefore CPU 10 selects the maximum one among RGp(i) for each i utilizing so called min-max calculation technique, and sets the next gear position NextGp for the gear position i corresponding to the maximum RGp(i).

The operation of the first embodiment is explained below with reference to FIG. 11, 12. That is, in accordance with the control program in FIG. 3, the required driving force Frq is inferred at the step 102, the turbine revolution speed Nt(i) is evaluated at the step 104, the turbine torque Tt(i) is inferred at the step 113, the post-shift driving force F(i) is evaluated at the step 114, the driving force deviation Ef(i) as the first parameter and the quantity of fuel flow Qf(i) as the second parameter are determined at the steps 115, 116, further the appraisal values REf(i) and RQf(i) of the parameters are referred at the step 117, then the appraisal value RGp(i) of a degree of correspondence of the gear position is evaluated at the step 118.

Figure 11:
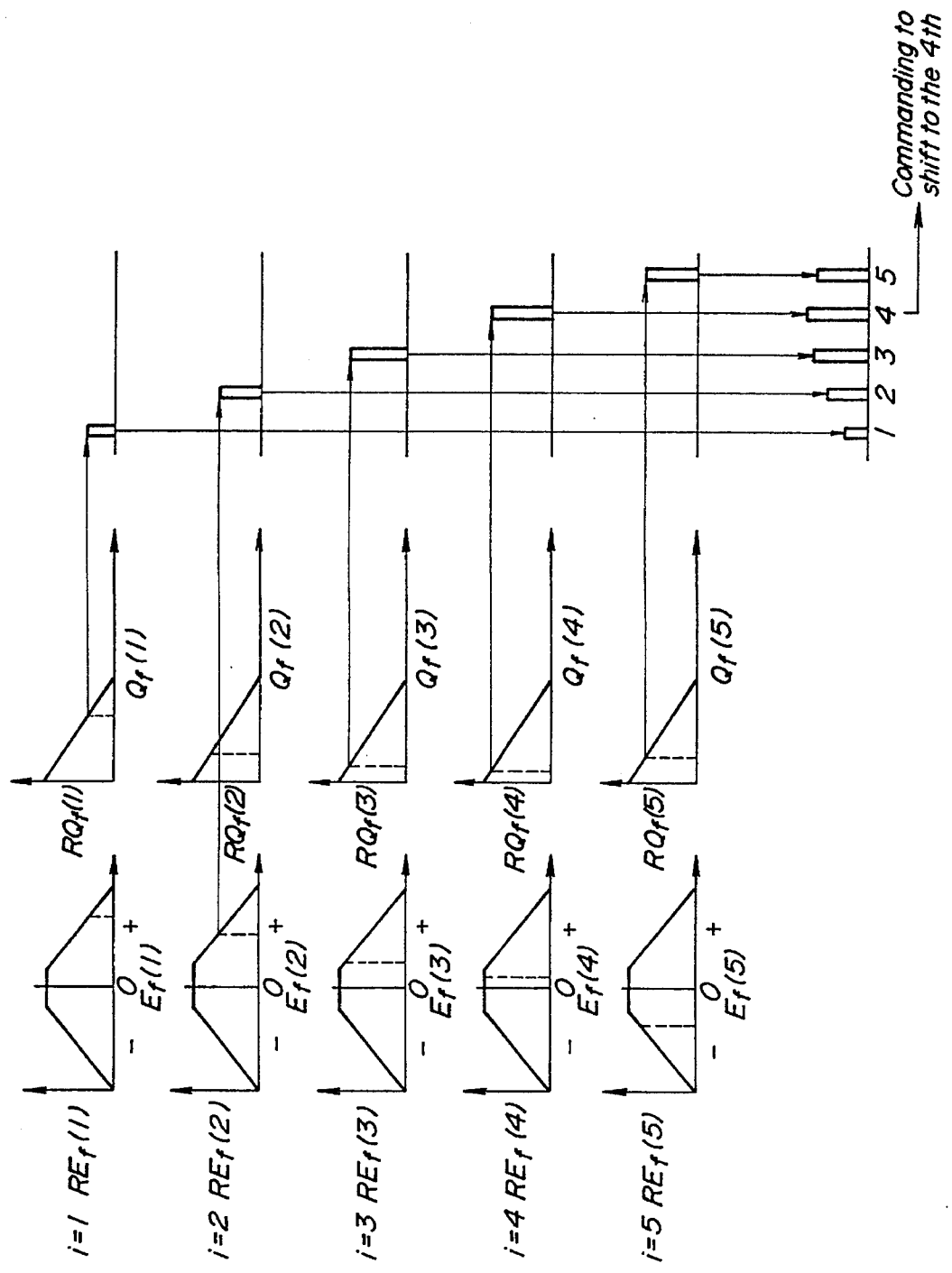
FIG. 11 is a map for an economy pattern available for setting the membership functions for inferring the degree of achievement of the driving force and for inferring the quantity of fuel flow in the control program in FIG. 3.

The above mentioned sequential appraisal method can be explained illustratively with a map for fuzzy inference in FIG. 11, wherein a membership function for describing the driving force deviation Ef(i) as the first parameter is set for the figure as shown in FIG. 9 and a membership function for describing the quantity of fuel flow Qf(i) as the second parameter is set for the figure as shown in FIG. 10, in respect of each gear position (i=1 to 5), so that the Y-coordinate of the point on the membership function corresponding to the point indicating the driving force deviation Ef(i) on the X-axis becomes the membership value REf(i), while the Y-coordinate of the point on the membership function corresponding to the point indicating the quantity of fuel flow Qf(i) on the X-axis becomes the membership value RQf(i). Then, either smaller one (Min) of both membership values REf(i), RQf(i) becomes the appraisal value RGp(i) of a degree of correspondence of the gear position, and the next gear position NextGp is set for the gear position i corresponding to the maximum RGp(i).

Thus, the determined next gear position NextGp becomes the gear position which satisfies the production rule that "the deviation between the driver's requiring driving force Frq and the post-shift driving force is small, while the fuel consumption ratio becomes good."

In the program in FIG. 3, instead of the min-max calculation technique, the barycenter technique (by which the position of a center of gravity among the membership values is utilized to determine the next gear position; further comment of which is omitted because it is well-known) may be utilized.

Further, in the program in FIG. 3, instead of the limited i which satisfies the condition Gpmin≦i≦Gpmax, the controls at the step 113 and following steps may be executed for all of i (i=1 to 5).

Incidentally, by the above mentioned modification of i, the number of object to be appraised may become increased so that the calculating and processing time may become increased. The reason is that, in the latter case wherein the controls are executed for each speed change ratio of a finite speed change ratio sequence including the maximum and the minimum speed change ratio, the possibility of increasing of the number of objects to be appraised become higher than that in the former case wherein the controls are executed for each speed change ratio of a finite speed change ratio sequence between a speed change ratio which arises the engine speed to the maximum speed in an allowable engine speed range and a speed change ratio which reduces the engine speed to the minimum speed in the allowable engine speed range, corresponding to a vehicle speed.

FIG. 5 (a) is a flow chart showing an additional control program to be inserted between the step 114 and step 115 of the control program in FIG. 3 for consisting a second embodiment of a shift control system according to the present invention, wherein either or both of the first and the second membership functions are set and memorized as plural maps, and one or more maps are selected among the memorized maps by a driver's switching action. With this second embodiment, CPU 10 reads signals S1, S2, . . . indicating selected membership functions from one or more select switches (not shown) operated by a driver at a step 151 subsequent to the step 114, and selects one or more among the memorized maps for either or both of the first and the second membership functions corresponding to the signals at the next step 152, wherein the number of the maps should be equal to the number of the selectable positions of the select switches.

Figure 12:
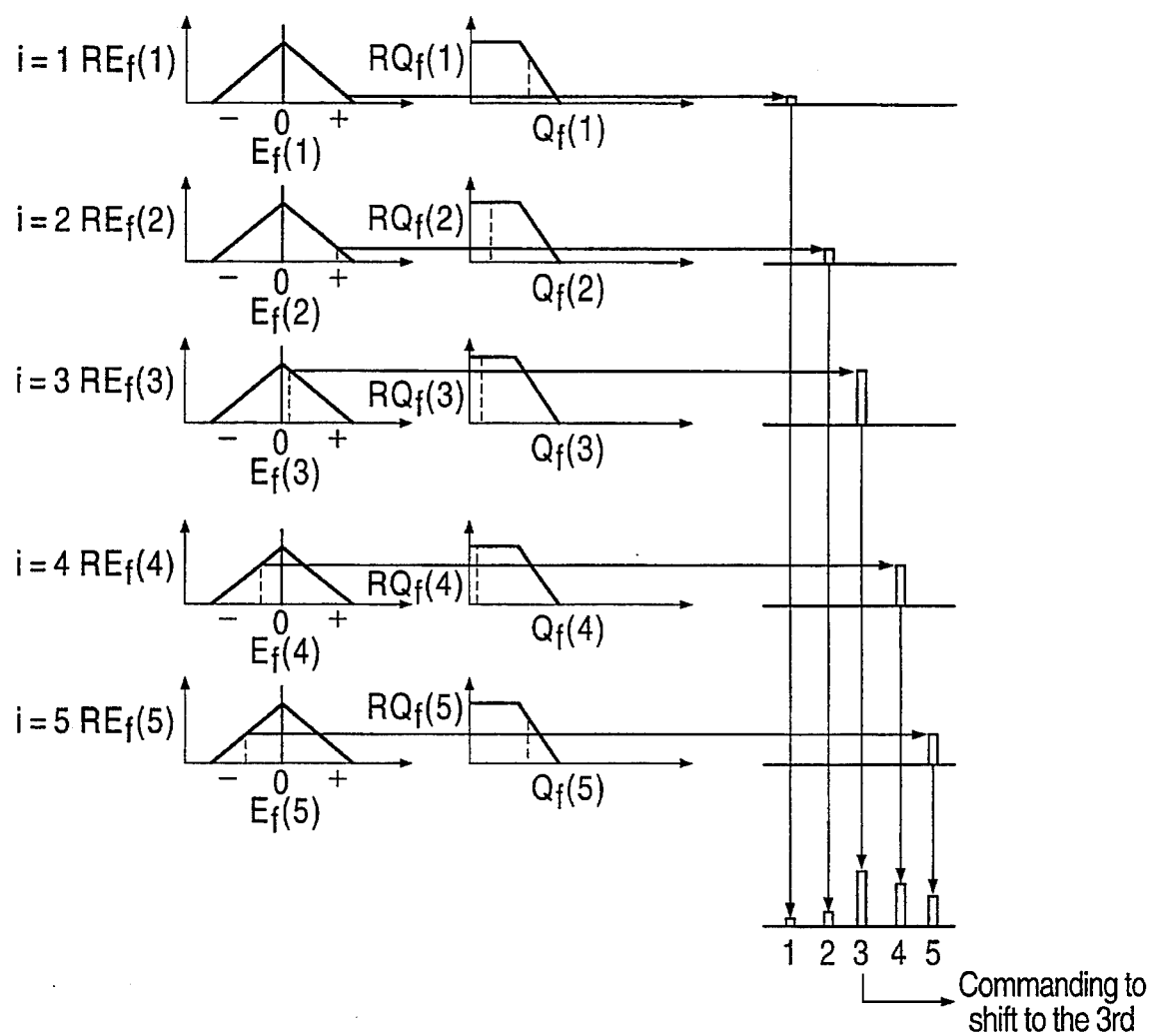
FIG. 12 is a map for a power pattern available for setting the membership functions for inferring the degree of achievement of the driving force and for inferring the quantity of fuel flow in the control program in FIG. 3.

The maps may be set suitably based on the characteristics intended to give to the vehicle, e.g. set for an economy pattern illustratively shown in FIG. 11 and a power pattern illustratively shown in FIG. 12, so that these maps for the economy pattern and the power pattern can be used selectively for the inference of the fuel consumption at the step 115 and the evaluation of the appraisal value RGp(i) of a degree of correspondence of the gear position at the step 118, respectively.

The second embodiment enables to provide an advantage that a desirable characteristic can be selected by a driver among plural characteristics intended to give to the vehicle, due to the additional control program, wherein, if the power pattern in FIG. 12 is selected, then more powerful gear position (third gear) than that in the case of the economy pattern is selected as shown in FIG. 12 even under the same driving condition.

FIG. 5 (b) is a flow chart showing an additional control program to be inserted between the step 114 and step 115 of the control program in FIG. 3 for consisting a third embodiment of a shift control system according to the present invention, wherein either or both of the first and the second membership functions are set and memorized as plural maps, and one or more maps are selected among the memorized maps corresponding to a driving condition. With this third embodiment, CPU 10 evaluates a changing rate dTVO of the throttle valve opening by subtracting the last time value TVO(k−1) of the throttle valve opening from the present value TVO(k) of the same at a step 161 subsequent to the step 114, and carries out a judgment that whether dTVO is greater than a preset value (e.g. 40 deg/sec) or not at the next step 162.

Based on the judgment, e.g. if dTVO>40 then CPU 10 selects the map for an economy pattern at a step 164, on the other hand if dTVO≦40 then CPU 10 selects the map for a power pattern at a step 164. Though the two kinds of map are utilized in the foregoing explaining, more than three kinds of map may be utilized according to the third example.

The third embodiment enables to provide an advantage that one map can be selected automatically based on the driving condition among plural maps memorized previously, due to the additional control program.

FIG. 5 (c) is a flow chart showing an additional control program to be inserted between the step 114 and step 115 of the control program in FIG. 3 for consisting a fourth embodiment of a shift control system according to the present invention, wherein, when up-shifting, for speed change ratios higher than the present speed change ratio the appraisal values of the first parameter are set smaller than that of down-shifting, on the other hand, when down-shifting, for speed change ratios lower than the present speed change ratio the appraisal values of the first parameter are set smaller than that of up-shifting by the speed change ratio selecting means. With this fourth embodiment, CPU 10 carries out a judgment that which of up-shifting and down-shifting become executed. This judgment may be carried out by watching the variation of the gear ratio.

Figure 13:
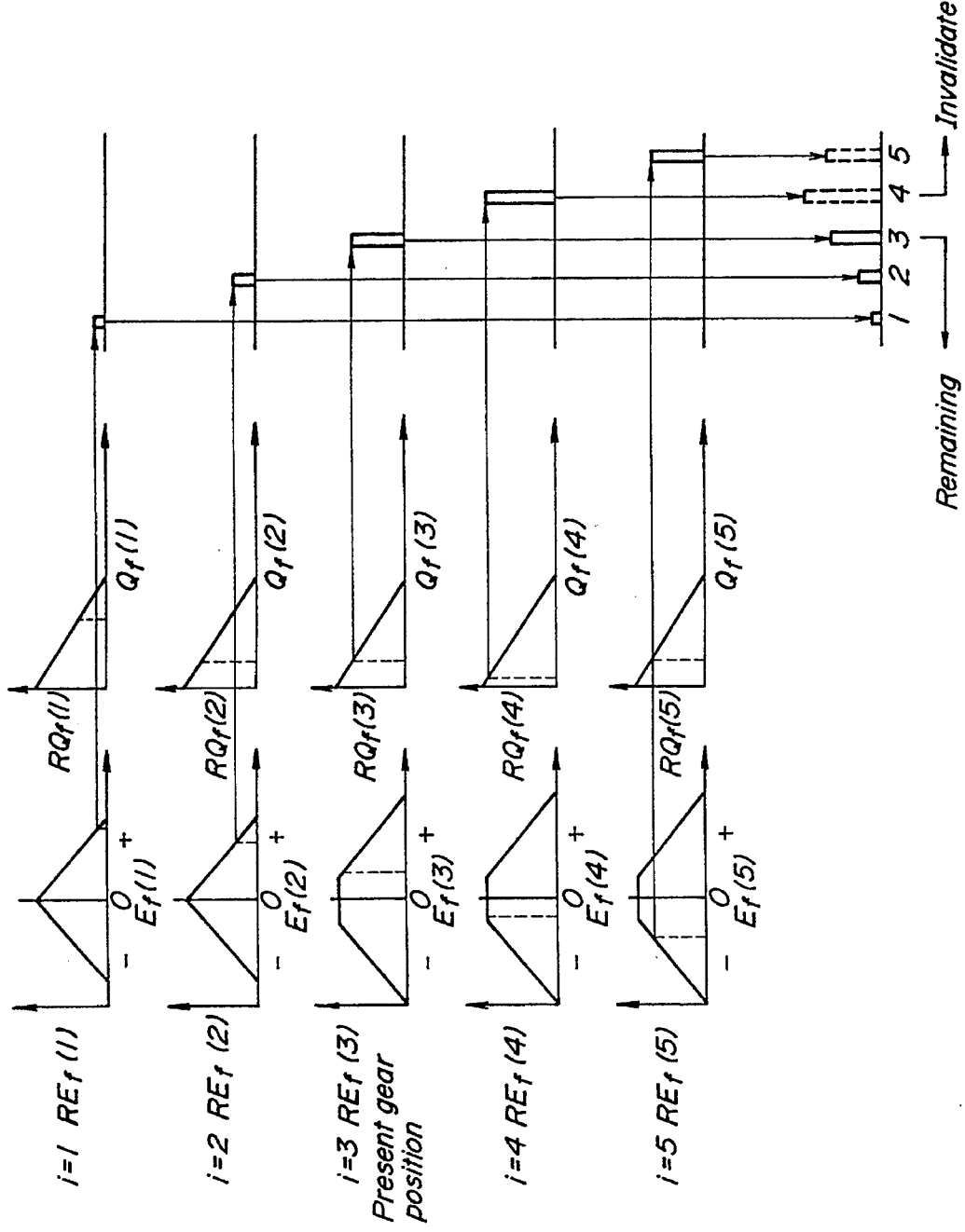
FIG. 13 is a diagram for explaining fuzzy inference for down-shifting in the fourth embodiment according to the present invention; and, FIG. 14 and FIG. 15 are diagrams for explaining fuzzy inference for up-shifting in the fourth embodiment according to the present invention.
Figure 14:
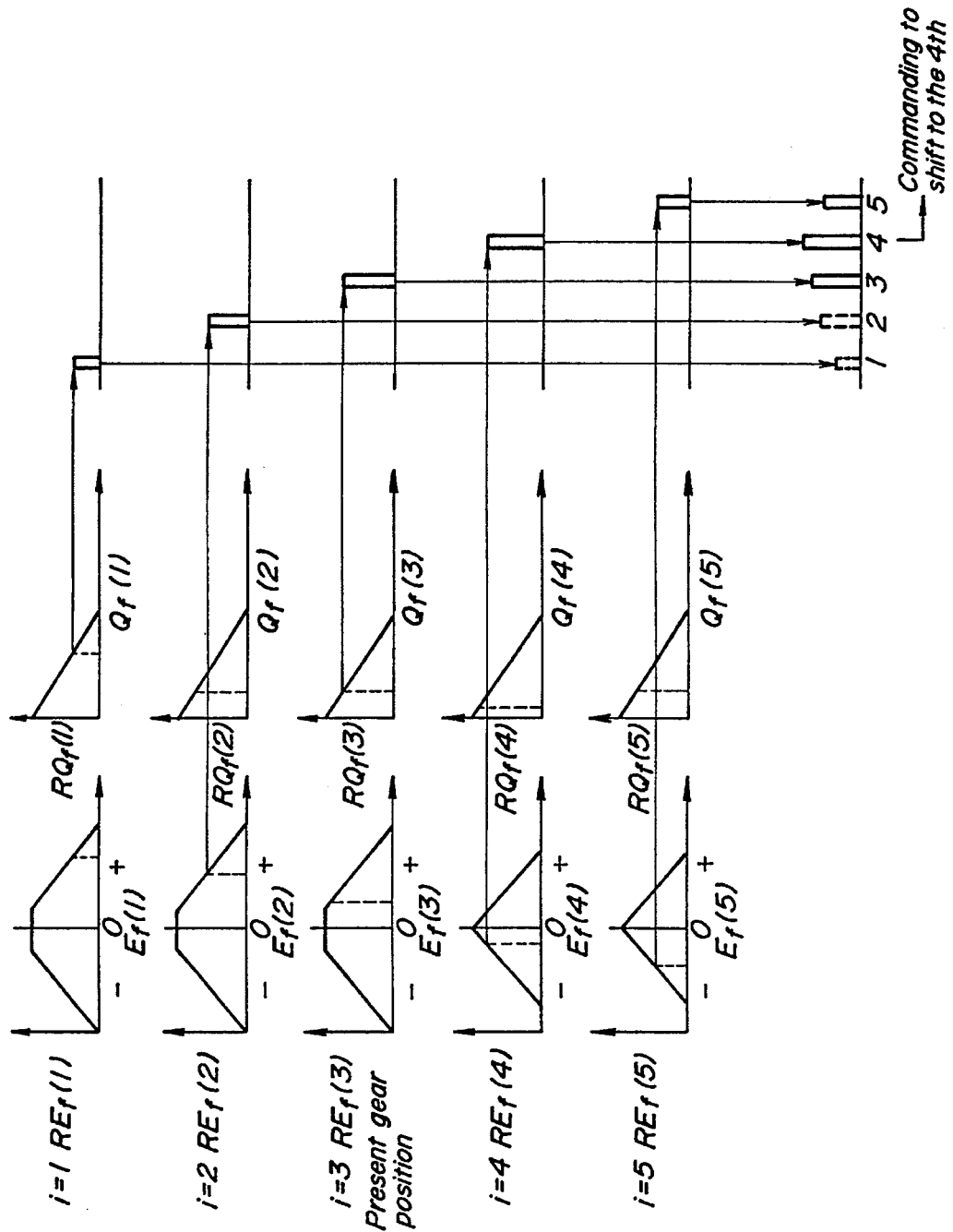
Figure 15:
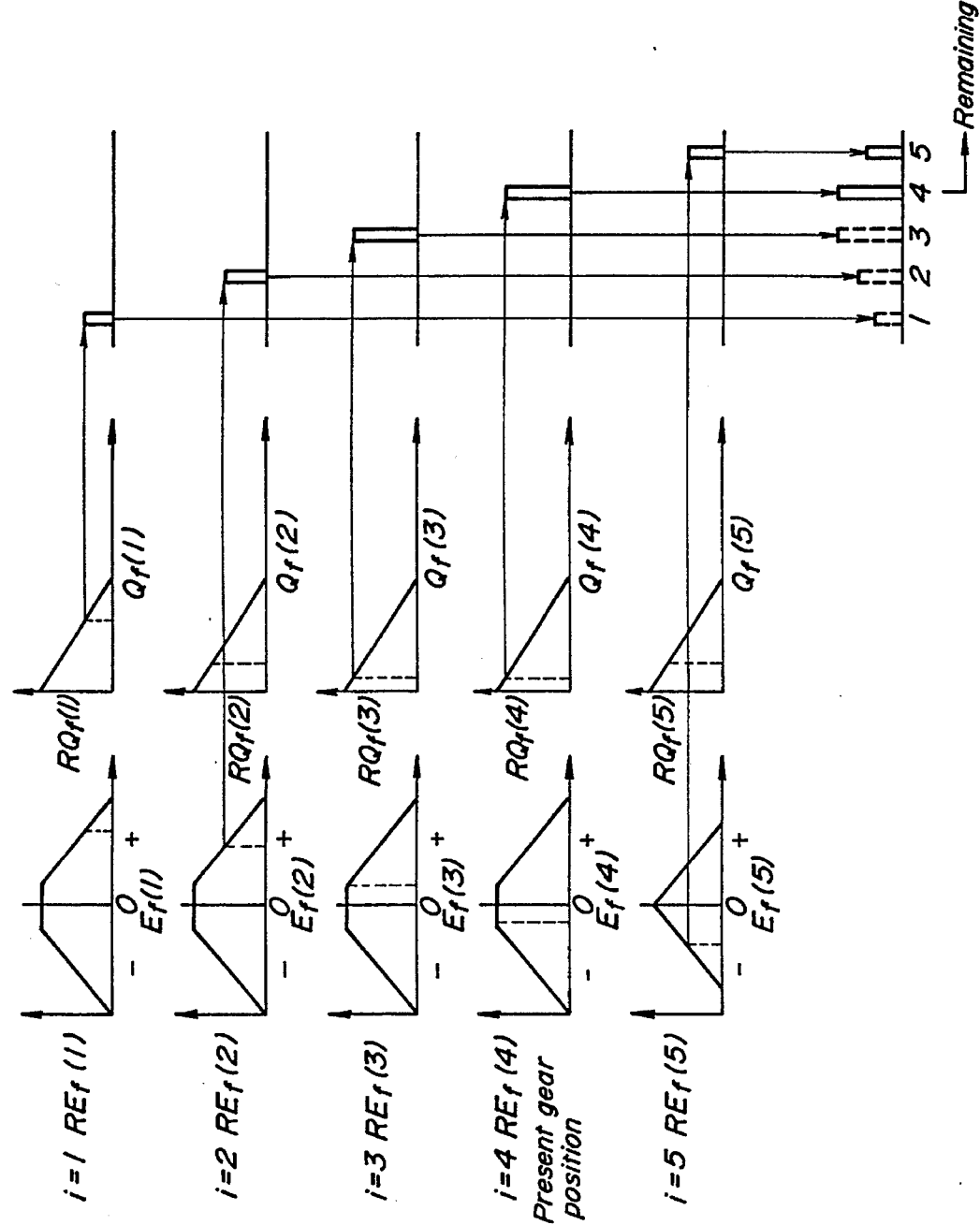

Based on the judgment, if down-shifting become executed then CPU 10 selects the map for down-shifting in FIG. 13 at a step 172, on the other hand if up-shifting become executed then CPU 10 selects the map for up-shifting in FIG. 14 or FIG. 15 at a step 173.

In the map for down-shifting in FIG. 13, the membership function of the driving force deviation Ef(i) as the first parameter is set like that e.g. the present gear position is supposed to be the third gear (i=3), the membership values of lower gear positions than the present gear position i.e. the membership values of the second and the first gears become smaller than that in the case of up-shifting. Consequently, when the inference of the degree of correspondence of the gear position is executed utilizing the map for down-shifting by the way as shown in FIG. 11, the fourth gear which has the maximum membership value is invalidated since it is contrary to the proposition of down-shifting, and the membership values of the second and the first gears become smaller than that of the third gear clearly, so that the present gear position (third gear) is maintained.

On the other hand, in the map for up-shifting in FIG. 14, the membership function of the driving force deviation Ef(i) as the first parameter is set like that e.g. the present gear position is supposed to be the third gear (i=3), the membership values of upper gear positions than the present gear position i.e. the membership values of the fourth and the fifth gears become smaller than that in the case of down-shifting. Consequently, when the inference of the degree of correspondence of the gear position is executed utilizing the map for up-shifting by the way as shown in FIG. 11, the fourth gear which has the maximum membership value is selected since it satisfies the proposition of up-shifting, and after shifting to the fourth gear, the map being utilized changes to the one in FIG. 15, so that the membership value of the fifth gear becomes smaller than that of the fourth gear, therefore the fourth gear is maintained.

The fourth embodiment enables to provide advantages that the shifting control can be given a hysteresis and shift-hunting is inhibited since the gear position tends to be maintained in the present position in the shifting control, due to changing of the maps.

Incidentally, in the first, second and third embodiment, the control at the step 121 may be as of the control program in FIG. 4 (b), wherein the greater one (Max) is selected for the next gear position NextGp out of RGp(CurGp) as the present value of RGp(i) and a value given by multiplying RGp(i) by a coefficient Kshift (e.g. 0.9) at a step 141. In the equation, i should satisfy the condition that i≠CurGp and Gpmin≦i≦Gpmax.

With this arrangement, the shifting control in the first, second and third embodiment can be given a hysteresis characteristics, and shift-hunting is inhibited since the gear position tends to be maintained in the present position in the shifting control in these embodiments, without changing the maps.

On the other hand, in each embodiment, accelerating time or mean horsepower in a predetermined time interval may be utilized for the second parameter instead of the fuel consumption ratio.

While the present invention has been described with reference to certain specific embodiments, it is of course that various alterations and/or modifications may be made without departing from the scope of the invention.

What is claimed is:

1. A system for controlling a speed change ratio shifting operation of an automatic transmission for an automotive vehicle, comprising:

required driving force inferring means inferring a driving force required by a driver of said automotive vehicle;

post-shift driving force inferring means inferring a driving force after a speed change ratio shifting operation of said automatic transmission to a resulting speed change ratio corresponding to each of given plural speed change ratios which are obtainable by said speed change ratio shifting operation of said automatic transmission;

first parameter calculating means designating a deviation between said required driving force and said driving force after said speed change ratio shifting operation of said automatic transmission as a first parameter and calculating a degree of said driving force deviation as a first parameter value, for each of said given speed change ratios;

second parameter calculating means designating a given condition of said automotive vehicle as a second parameter and calculating a value of said condition as a second parameter value, for each of said given speed change ratios;

speed change ratio selecting means determining membership values of said first and said second parameters based on membership functions of said first and second parameters for each of said given speed change ratios, selecting an optimum speed change ratio among said given speed change ratios by referring to said membership values of said first and said second parameters for said given speed change ratios based on fuzzy inference, and producing an output signal corresponding to said optimum speed change ratio; and means, responsive to said output signal, for controlling said speed change ratio shifting operation of said automatic transmission to achieve said optimum speed change ratio.

2. The system according to claim 1, wherein said given condition of said automotive vehicle designated as said second parameter is a fuel consumption ratio of an engine mounted on said automotive vehicle and associated with said automatic transmission.

3. The system according to claim 2, wherein said given speed change ratios for which said post-shift driving force inferring means and said second parameter calculating means calculate said first and said second parameter values, coincide with a sequence of a finite number of speed change ratios obtainable by said speed change ratio shifting operation of said automatic transmission, and include maximum and minimum speed change ratios; and said speed change ratio selecting means determines an appraisal value based on said membership values of said first and said second parameters for each of said given speed change ratios, and selects a speed change ratio corresponding to an appraisal value positioned at a barycenter of said appraisal values for said given speed change ratios, based on fuzzy inference.

4. The system according to claim 2, wherein said given speed change ratios for which said post-shift driving force inferring means and said second parameter calculating means calculate said first and said second parameter values, coincide with a sequence of a finite number of speed change ratios obtainable by speed change ratio shifting operation of said automatic transmission, and include maximum and minimum speed change ratios; and said speed change ratio selecting means determines an appraisal value based on said membership values of said first and said second parameters for each of said given speed change ratios, based on fuzzy inference, and selects a speed change ratio corresponding to a maximum appraisal value among said appraisal values for said given speed change ratios.

5. The system according to claim 2, wherein said given speed change ratios for which said post-shift driving force inferring means and said second parameter calculating means calculate said first and said second parameter values, coincide with a sequence of a finite number of speed change ratios obtainable by said speed change ratio shifting operation of said automatic transmission between two speed change ratios, one of which increases an engine speed of an engine mounted on said automotive vehicle and associated with said automatic transmission, to a maximum speed, and another of which reduces said engine speed to a minimum speed within an allowable engine speed range of said engine under a current vehicle speed of said automotive vehicle; and said speed change ratio selecting means determines an appraisal value based on said membership values of said first and said second parameters for each of said given speed change ratios, and selects a speed change ratio corresponding to an appraisal value positioned at a barycenter of said appraisal values for said given speed change ratios, based on fuzzy inference.

6. The system according to claim 2, wherein said given speed change ratios for which said post-shift driving force inferring means and said second parameter calculating means calculate said first and said second parameter values, coincide with a sequence of a finite number of speed change ratios obtainable by said speed change ratio shifting operation of said automatic transmission between two speed change ratios, one of which increases an engine speed of an engine mounted on said automotive vehicle and associated with said automatic transmission, to a maximum speed, and another of which reduces said engine speed to a minimum speed within an allowable engine speed range of said engine under a current vehicle speed of said automotive vehicle; and said speed change ratio selecting means determines an appraisal value based on said membership values of said first and said second parameters for each of said given speed change ratios, based on fuzzy inference, and selects a speed change ratio corresponding to a maximum appraisal value among said appraisal values for said given speed change ratios.

7. The system according to claim 2, wherein said speed change ratio selecting means selects a smaller value of said membership values of said first and said second parameters as an appraisal value for each of said given speed change ratios using fuzzy inference.

8. The system according to claim 2, wherein said required driving force inferring means infers said required driving force from a current engine load of an engine mounted on said automotive vehicle and associated with said automatic transmission.

9. The system according to claim 2, wherein said post-shift driving force inferring means infers said post-shift driving force from a current vehicle speed of said automotive vehicle, a current engine load of an engine mounted on said automotive vehicle and associated with said automatic transmission, and said resulting speed change ratio of said automatic transmission.

10. The system according to claim 2, wherein said speed change ratio selecting means defines, in response to up-shifting, said membership values of said first parameter for speed change ratios which are smaller than a current speed change ratio to be smaller than that of down-shifting, and defines, in response to down-shifting, said membership values of said first parameter for speed change ratios which are larger than a current speed change ratio to be larger than that in case of up-shifting.

11. The system according to claim 1, wherein said given speed change ratios for which said post-shift driving force inferring means and said second parameter calculating means calculate said first and said second parameter values, coincide with a sequence of a finite number of speed change ratios obtainable by said speed change ratio shifting operation of said automatic transmission, and include maximum and minimum speed change ratios; and said speed change ratio selecting means determines an appraisal value based on said membership values of said first and said second parameters for each of said given speed change ratios, and selects a speed change ratio corresponding to an appraisal value positioned at a barycenter of said appraisal values for said given speed change ratios, using fuzzy inference.

12. The system according to claim 1, wherein said given speed change ratios for which said post-shift driving force inferring means and said second parameter calculating means calculate said first and said second parameter values, coincide with a sequence of a finite number of speed change ratios obtainable by said speed change ratio shifting operation of said automatic transmission, and include maximum and minimum speed change ratios; and said speed change ratio selecting means determines an appraisal value based on said membership values of said first and said second parameters for each of said given speed change ratios using fuzzy inference, and selects a speed change ratio corresponding to a maximum appraisal value for said given speed change ratios.

13. The system according to claim 1, wherein said given speed change ratios for which said post-shift driving force inferring means and said second parameter calculating means calculate said first and said second parameter values, coincide with a sequence of a finite number of speed change ratios obtainable by said speed change ratio shifting operation of said automatic transmission between two speed change ratios, one of which increases an engine speed of an engine mounted on said automotive vehicle and associated with said automatic transmission, to a maximum speed, and another of which reduces said engine speed to a minimum speed within an allowable engine speed range of said engine under a current vehicle speed of said automotive vehicle; and said speed change ratio selecting means determines an appraisal value based on said membership values of said first and said second parameters for each of said given speed change ratios, and selects a speed change ratio corresponding to an appraisal value positioned at a barycenter of said appraisal values for said given speed change ratios, using fuzzy inference.

14. The system according to claim 1, wherein said given speed change ratios for which said post-shift driving force inferring means and said second parameter calculating means calculate said first and said second parameter values, coincide with a sequence of a finite number of speed change ratios obtainable by said speed change ratio shifting operation of said automatic transmission between two speed change ratios, one of which increases an engine speed of an engine mounted on said automotive vehicle and associated with said automatic transmission, to a maximum speed, and another of which reduces said engine speed to a minimum speed within an allowable engine speed range of said engine under a current vehicle speed of said automotive vehicle; and said speed change ratio selecting means determines an appraisal value based on said membership values of said first and said second parameters for each of said given speed change ratios using fuzzy inference, and selects a speed change ratio corresponding to a maximum appraisal value among said appraisal values for said given speed change ratios.

15. The system according to claim 1, wherein said speed change ratio selecting means selects a smaller value of said membership values of said first and said second parameters as an appraisal value for each of said given speed change ratios using fuzzy inference.

16. The system according to claim 1, wherein said required driving force inferring means infers said required driving force from a current engine load of an engine mounted on said automotive vehicle and associated with said automatic transmission.

17. The system according to claim 1, wherein said post-shift driving force inferring means infers said post-shift driving force from a current vehicle speed of said automotive vehicle, a current engine load of an engine mounted on said automotive vehicle and associated with said automatic transmission, and said resulting speed change ratio of said automatic transmission.

18. The system according to claim 15, wherein said speed change ratio selecting means stores plural functions for said first membership function and said second membership function, and selects a function from said plural functions based on a switching action of said driver for use as a membership function.

19. The system according to claim 15, wherein said speed change ratio selecting means stores plural functions for said first membership function and said second membership function, and selects a function from said plural functions based on a current driving condition of said automotive vehicle for use as a membership function.

20. The system according to claim 1, wherein said speed change ratio selecting means defines, in response to up-shifting, said membership values of said first parameter for speed change ratios which are smaller than a current speed change ratio to be smaller than that of down-shifting, and defines, in response to down-shifting, said membership values of said first parameter for speed change ratios which are larger than a current speed change ratio to be larger than that in case of up-shifting.

21. A system for controlling a speed change ratio shifting operation of an automatic transmission for an automotive vehicle, comprising:

means for inferring a driving force required by a driver of said automotive vehicle;

means for inferring a driving force after the speed change ratio shifting operation of said automatic transmission for each speed change ratio which is obtainable by said speed change ratio shifting operation of said automatic transmission;

means for calculating a deviation between said driving force required by the diver and said driving force after the speed change ratio shifting operation as a first parameter for said each speed change ratio;

means for calculating a given condition of said automotive vehicle as a second parameter value for said each speed change ratio;

means for determining membership values of said first and said second parameters in accordance with membership functions of said first and second parameters for said each speed change ratio, selecting an optimum speed change ratio based on said membership values of said first and said second parameters for said each speed change ratio, and producing an output signal corresponding to said optimum speed change ratio; and means, responsive to said output signal, for controlling said speed change ratio shifting operation of said automatic transmission to achieve said optimum speed change ratio.

22. In a shift control system for an automatic transmission of an automotive vehicle based on fuzzy control, a method for controlling a speed change ratio shifting operation comprising the steps of:

(a) producing a signal representative of a driving force required by a driver of said automotive vehicle;

(b) producing a signal representative a driving force after a speed change ratio shifting operation;

(c) producing a signal representative of a deviation between the signal representative of the driving force required by the driver and the driving force after the speed change ratio shifting operation;
(d) producing a signal representative of a given condition of said automotive vehicle;
(e) repeating steps (b)–(d) for each speed change ratio obtainable by said shift control system; and
(f) producing for said each speed change ratio signals corresponding to membership values derived from membership functions of the deviation and the given condition of said automotive vehicle;
(g) selecting an optimum speed change ratio based on said signals corresponding to said membership values; and
(h) controlling said speed change ratio shifting operation of said automatic transmission to achieve said optimum speed change ratio.

* * * * *